(12) United States Patent
Kumar et al.

(10) Patent No.: US 7,835,891 B2
(45) Date of Patent: Nov. 16, 2010

(54) METHOD AND APPARATUS FOR GENERATING ALTERNATIVE REPRESENTATION OF OPTIMIZATION MODELS

(75) Inventors: Tarun Kumar, Ossining, NY (US); Gyana Ranjan Parija, Briarcliff Manor, NY (US); Haifeng Xi, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 12/047,705

(22) Filed: Mar. 13, 2008

(65) Prior Publication Data

US 2008/0208552 A1  Aug. 28, 2008

(51) Int. Cl.
*G06F 17/50* (2006.01)
*G06F 7/60* (2006.01)
(52) U.S. Cl. .......................................... 703/2
(58) Field of Classification Search ................ 703/6; 700/33, 29
See application file for complete search history.

(56) References Cited

U.S. PATENT DOCUMENTS 5,929,860 A * 7/1999 Hoppe ........................ 345/419

2002/0116158 A1  8/2002  Heching et al.

OTHER PUBLICATIONS

John M. Greenlee, Wildland Fire Modeling and Strategy Assessment, Springer Netherlands, Fire Technology, vol. 18, No. 3, Aug. 1982, 14 pages.*
Greenlee, Widland Fire Molding and Strategy Assessment, Aug. 1, 1982, Fire Technology, vol. 18, Issue 3, pp. 237-250.

* cited by examiner

*Primary Examiner*—Paul L Rodriguez
*Assistant Examiner*—Luke Osborne
(74) *Attorney, Agent, or Firm*—Whitham, Curtis, Christofferson & Cook, P.C.; Stephen C. Kaufman

(57) ABSTRACT

A computer implemented method for determining an alternative representation of an optimization model reduces model input through compact representation of model parameters. Model generation is performed at varying levels of complexity (approximation) depending on pre-defined, business approved thresholds. The computer receives a set of functions representing a set of events where each function includes sets of first and second axis coordinate values. Each of the functions are transformed to a compacted function which includes a set of pieces including an anchor point, break points, and slopes. Successive pieces having the same slope value are removed. Alternate optimization models are generated based on the set of pieces representing a compacted function and on a predetermined accuracy value.

1 Claim, 11 Drawing Sheets

METHOD AND APPARATUS FOR GENERATING ALTERNATIVE REPRESENTATION OF OPTIMIZATION MODELS

GOVERNMENT LICENSE RIGHTS

This invention was made with Government support under Contract No. 43-82X9-3-5073 awarded by USDA, Forest Service. The U.S. Government has certain rights in this invention.

BACKGROUND OF THE INVENTION

1. Field of the Invention

The present invention generally relates to computer-implemented optimization models for solution of problems and, more particularly, to an approach for generating alternative representations for an optimization model while keeping model parameters at an acceptable, pre-determined accuracy threshold.

2. Background Description

Real-world modeling problems often result in an implementation that makes the model instances intractable due to computationally prohibitive data size and structural complexity. The prior art solutions to such large problems involved simplification of the model by either aggregating the data or simplifying the model assumptions. Hence, the resulting solution is sub-optimal due to both data aggregation and model simplification, and even solving smaller sized problems results in sub-optimal outcomes. As a result, the prior art solutions are not fully satisfactory.

SUMMARY OF THE INVENTION

An exemplary object of the present invention is to provide a system and method for using a computer implemented alternative model generation mechanism to solve the optimization model instances having varying degrees of size and complexity.

The present invention addresses the shortcomings of the prior art solutions by employing a flexible modeling approach which enables generation of model instances at varying levels of complexity, thereby enabling scalability. The present invention is thus able to solve model instances ranging from small size and/or low complexity to large size and/or high complexity, with graceful degradation of optimality.

According to present invention, each input data instance (for the optimization model) contains multiple sets of input parameter functions. Said method and system employ as input, in a machine-readable data format, a set of functions, each of which contains:

A set of x-axis values for the function.
A set of y-axis values for the function.

For example, in the FPA (Fire Program Analysis) application the fire perimeter input data contains data points representing cumulative perimeter growth values (y-axis), in chains/minute, at incremental time points (x-axis) during the course of a wild land fire.

The method and system according to the invention then produce as output for each of the functions, in a machine readable data format:

A set of break-point values.
A set of slope values for each piece defined by the break-point.
The first coordinate (x-axis value) of the anchor point.
The second coordinate (y-axis value) of the anchor point.

This results in a compaction of input data by eliminating redundant data points while maintaining the precision of the input function.

It is therefore an object of the invention to reduce model input through compact representation of model parameters.

As a second step, the method and system according to the invention takes in the output from the previous step and also the following additional parameter in a machine-readable data format:

Pre-determined accuracy threshold.

The method and system according to the invention then produces as output, for each of the functions, in a machine readable data format:

A set of break-point values.
A set of slope values for each piece defined by the break-point.
The first coordinate of the anchor point.
The second coordinate of the anchor point.

It is another object of the invention to enable model generation at varying levels of complexity (approximation) depending on pre-defined, business approved thresholds. According to the invention, there is provided an approach for generating alternative representations for an optimization model which has the following advantages:

Instances can be generated at varying levels of complexity depending on a pre-determined threshold. This in turn enables scalability.
Reduce model input and storage by extracting and compacting functional forms of the model parameters. In the case of the FPA, the parameters include fire growth and resource deployment parameter data.
Solve an efficient model with reduced memory requirements, improved solution time, and improved solution quality.

More specifically, the invention provides a method for determining an alternative representation of an optimization model based on establishing an acceptable threshold for modifying parameters. According to the invention, Domain Reduction is achieved by a data transformation component,
Domain Reduction facilitates an efficient reformulation of the model, and
The spectrum of domain reduction results in a series of hierarchical model instances.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Optimization modeling is a branch of Operations Research that involves formulating a decision making problem in a mathematical construct so as to maximize or minimize an objective function. The decision to be made is represented as decision variables while the appropriate measure of performance (i.e. profit) is expressed as a mathematical function, known as the objective function, using the decision variables and the problem parameters. The restrictions are represented as mathematical constructs called constraints. The common theme in optimization modeling is the search for an optimal solution. The optimization model, when combined with the input data (containing problem parameters), results in an optimization model instance. Tractability of the optimization model instance is crucial in reaching the optimal solution.

Figure 1:
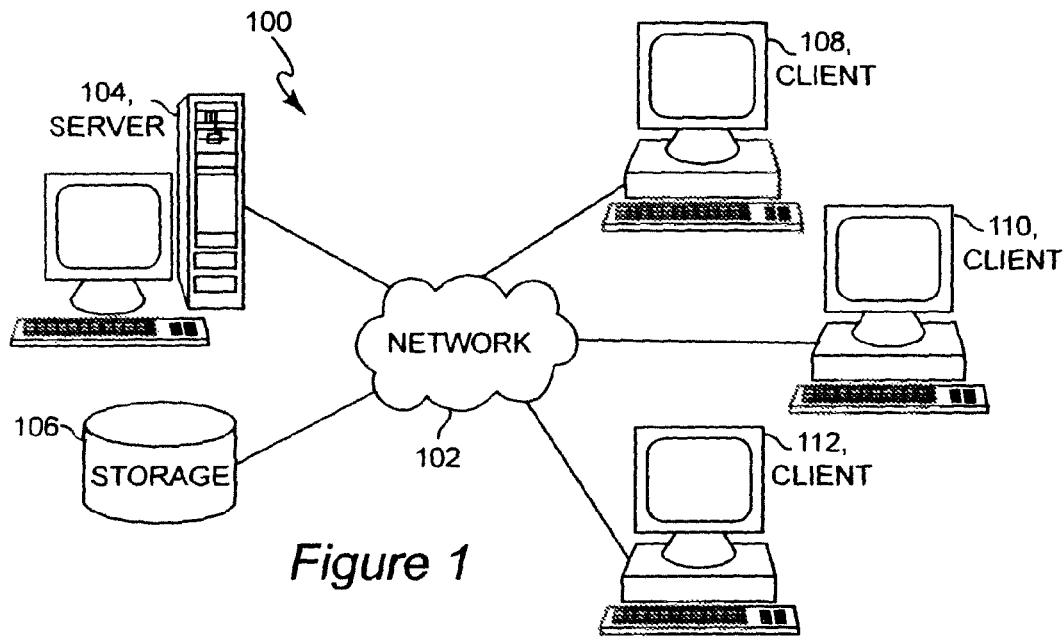
FIG. 1 is a block diagram of a computer system on which the method according to the invention may be implemented.

Referring now to the drawings, and more particularly to FIG. 1, there is shown a computer system on which the method according to the invention may be implemented. Computer system 100 contains a network 102, which is the medium used to provide communications links between various devices and computers connected together within computer system 100. Network 102 may include permanent connections, such as wire or fiber optic cables, wireless connections, such as wireless Local Area Network (WLAN) products based on the IEEE 802.11 specification (also known as Wi-Fi), and/or temporary connections made through telephone, cable or satellite connections, and may include a Wide Area Network (WAN) and/or a global network, such as the Internet. A server 104 is connected to network 102 along with storage unit 106. In addition, clients 108, 110 and 112 also are connected to network 102. These clients 108, 110 and 112 may be, for example, personal computers or network computers. For purposes of this application, a network computer is any computer, coupled to a network, which receives a program or other application from another computer coupled to the network. The server 104 provides data, such as boot files, operating system images, and applications to clients 108, 110 and 112. Clients 108, 110 and 112 are clients to server 104.

Computer system 100 may include additional servers, clients, and other devices not shown. In the depicted example, the Internet provides the network 102 connection to a worldwide collection of networks and gateways that use the TCP/IP (Transmission Control Protocol/Internet Protocol) suite of protocols to communicate with one another. At the heart of the Internet is a backbone of high-speed data communication lines between major nodes or host computers, consisting of thousands of commercial, government, educational and other computer systems that route data and messages. In this type of network, hypertext mark-up language (HTML) documents and applets are used to exchange information and facilitate commercial transactions. Hypertext transfer protocol (HTTP) is the protocol used in these examples to send data between different data processing systems. Of course, computer system 100 also may be implemented as a number of different types of networks such as, for example, an intranet, a local area network (LAN), or a wide area network (WAN). FIG. 1 is intended as an example, and not as an architectural limitation for the present invention.

Figure 2:
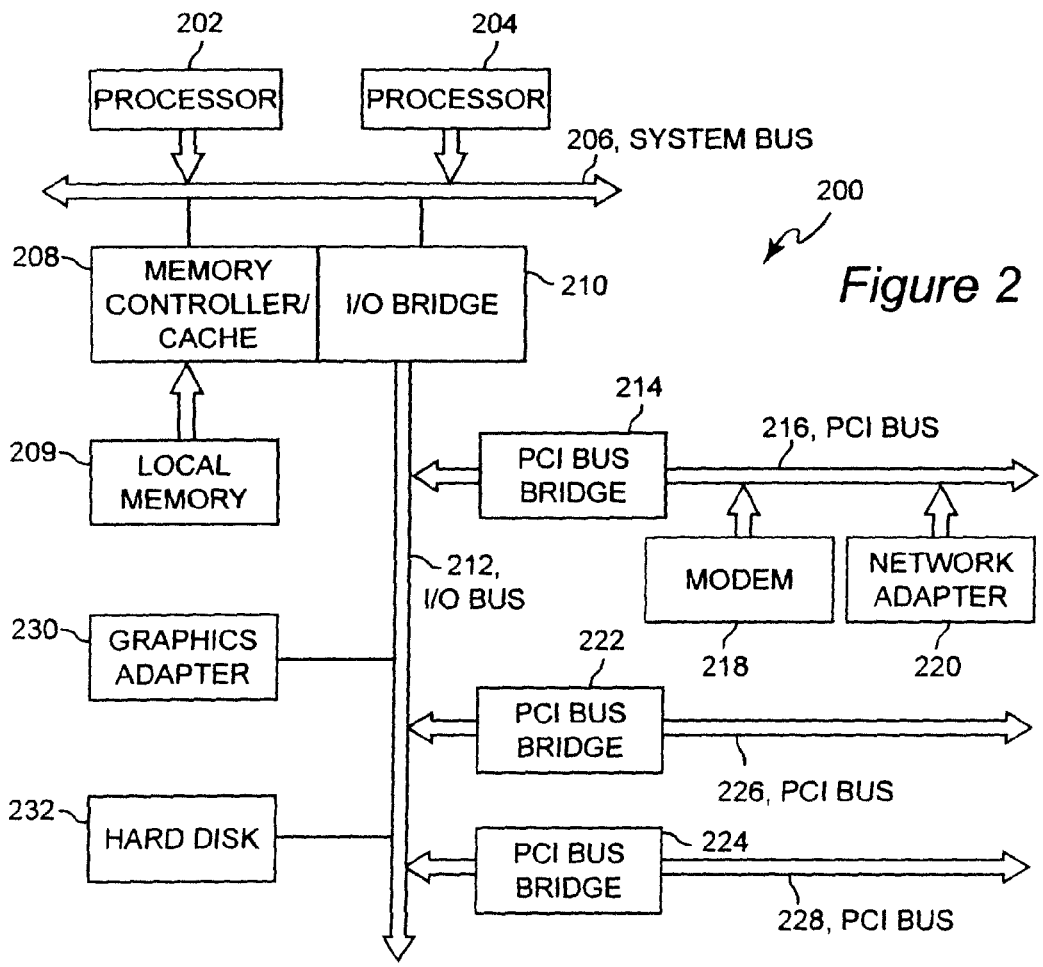
FIG. 2 is a block diagram of a server used in the computer system shown in FIG. 1.

Referring to FIG. 2, a block diagram of a data processing system that may be implemented as a server, such as server 104 in FIG. 1, is depicted in accordance with a preferred embodiment of the present invention. Server 200 may be used to execute any of a variety of business processes. Server 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. Input/Output (I/O) bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
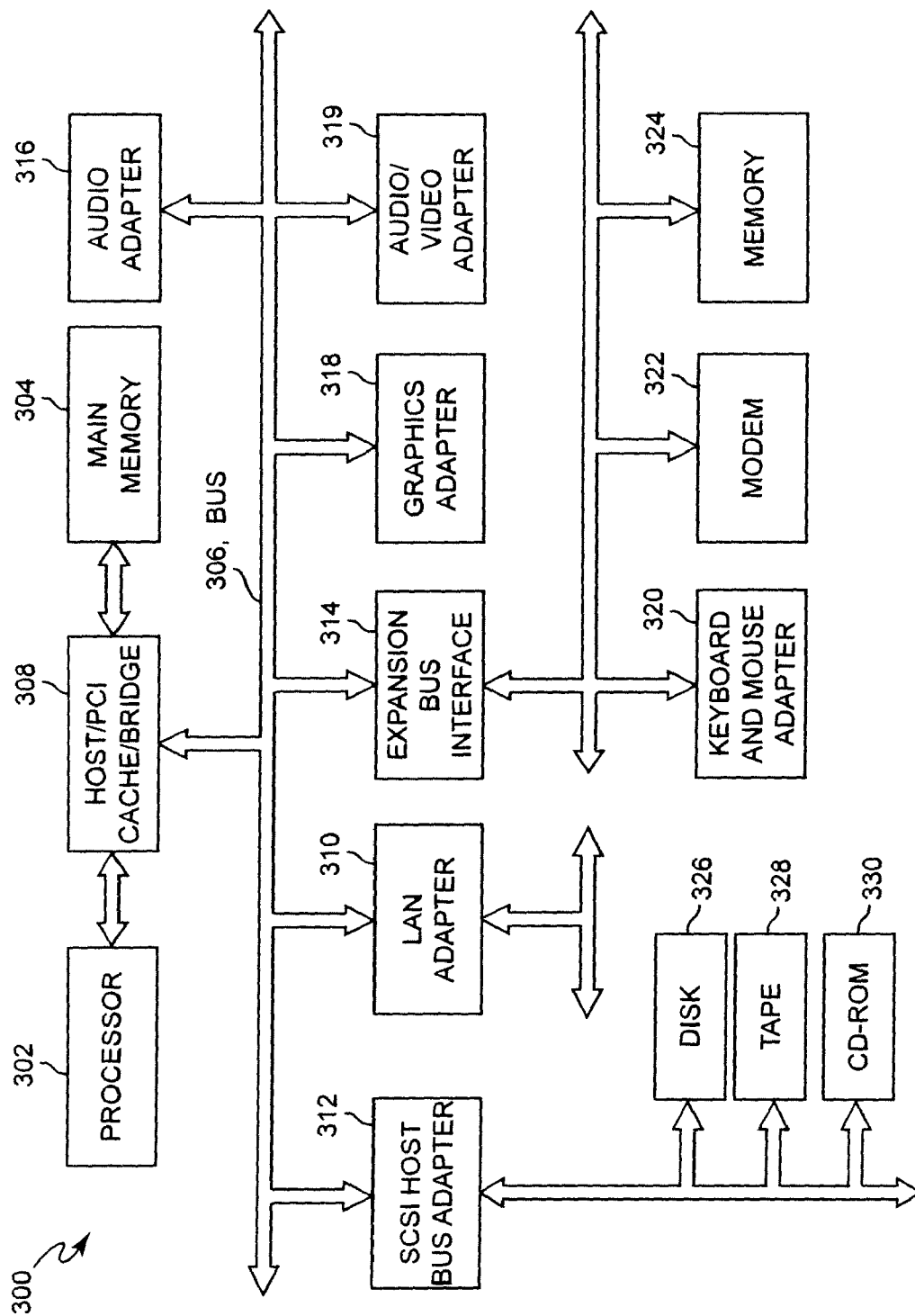
FIG. 3 is a block diagram of a client used in the computer system shown in FIG. 1.

With reference now to FIG. 3, a block diagram illustrating a client computer is depicted in accordance with a preferred embodiment of the present invention. Client computer 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, Small Computer System Interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object-oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, and/or I/O devices, such as Universal Serial Bus (USB) and IEEE 1394 devices, may be used in addition to or in place of the hardware depicted in FIG. 3. Also, the processes of the present invention may be applied to a multiprocessor data processing system.

Data processing system 300 may take various forms, such as a stand alone computer or a networked computer. The depicted example in FIG. 3 and above-described examples are not meant to imply architectural limitations.

Figure 4:
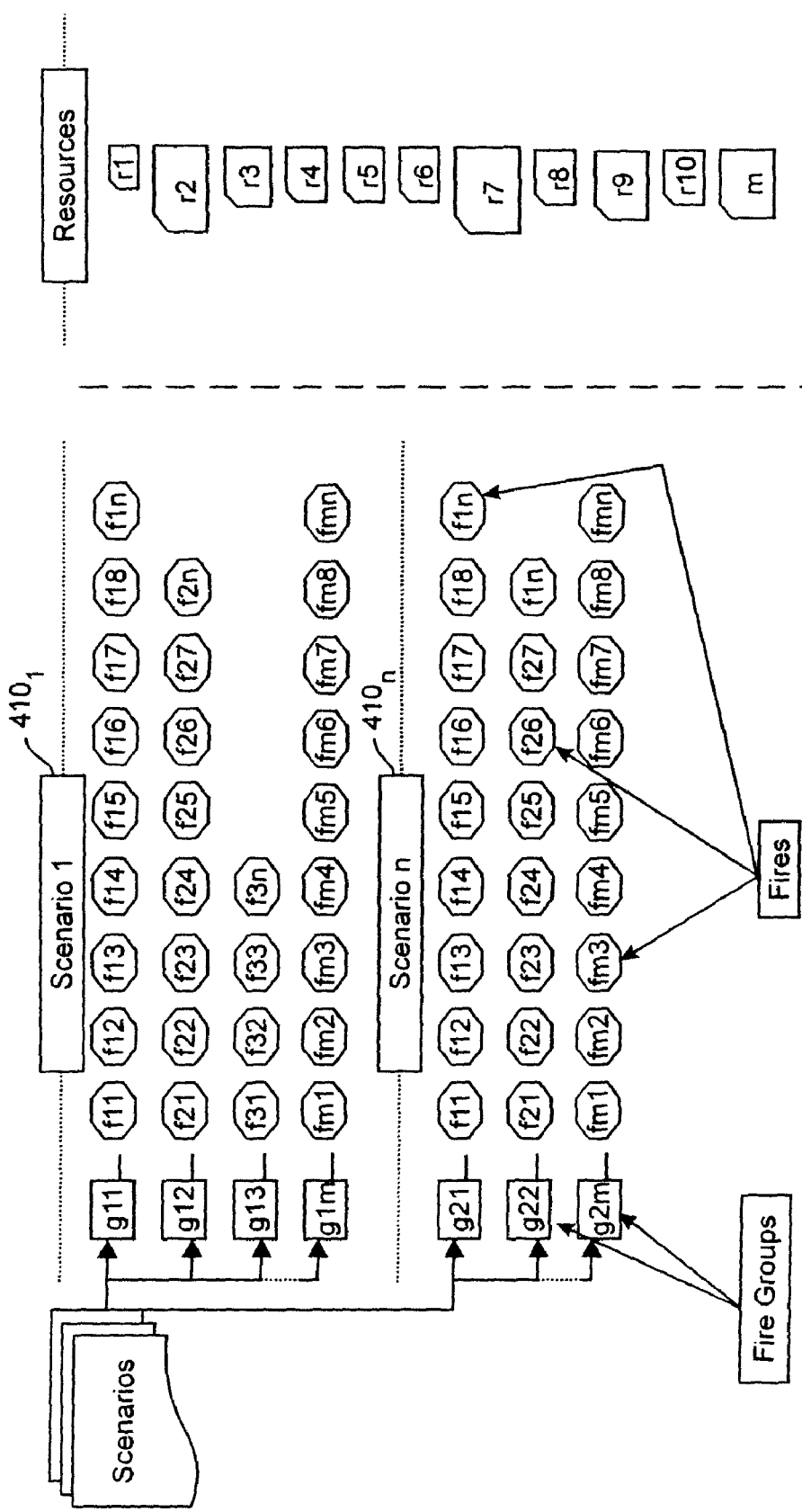
FIG. 4 is a block diagram illustrating a business problem which is solved using a two-stage stochastic integer program.

FIG. 4 shows scenarios $410_1$ to $410_n$ comprised of fire groups $g_{11}$ to $g_{1m}$ and $g_{21}$ to $g_{2m}$, respectively, each of which is in turn comprised of simultaneously occurring representative fires $f_{11}$ to $f_{mn}$. Also shown are resources $r_1$ to $r_m$ which can be assigned to only one of the simultaneous fires, resulting in competition among simultaneous fires for available resources.

Figure 5:
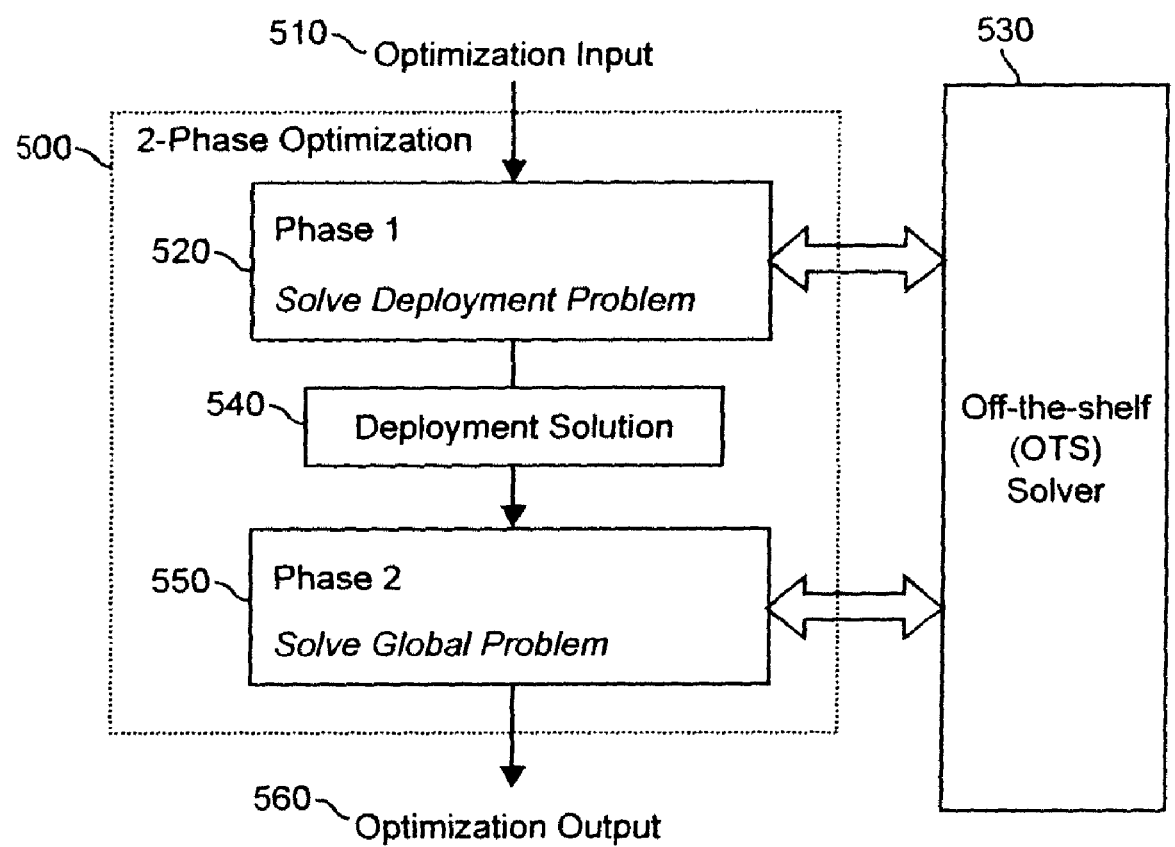
FIG. 5 is a block and data flow diagram illustrating a two-phase solution approach.

FIG. 5 shows a two phase optimization problem 500 which receives optimization input 510 on which is performed a phase one 520 decomposition using an off-the-shelf problem (OTS) solver 530 to produce a deployment solution 540, which optimally deploys resources to the fires to discover their resource preferences, and a phase two 550 global problem optimization, which uses the off-the-shelf problem solver 530 to solve the global problem and employs the deployment preference decisions made in phase one to analyze and come up with an optimization output 560 including the optimal initial response resource organization.

The optimization input 510 of FIG. 5 may contain a set of input values required to solve the model. Most notably it may contain data pertaining to:
1. Fires
2. Fire Groups
3. Fire-fighting Resources
4. Costs Data for each representative fire may contain its perimeter, size (in acres), weight (fire importance, e.g., fires occurring close to urban population have higher weights than those occurring in remote jungles). The optimization input 510 may also contain data pertaining to mop-up cost. A set of simultaneous fires may be grouped together to form a fire group, imposing additional restrictions on deployment of resources and containment of the fires.

Resources may contain deployment and cost data pertaining to each fire they may be deployed on. Each deployable resource on a fire may contain fixed cost (i.e., one time annual cost for procurement of resource), line production capacity (i.e., the capacity of the resource to contain a fire by producing a line using the retardant or land cleanup to contribute to fire containment), hourly cost (i.e., the hazard and overtime pay to the resources—machines and human crew over the deployment period). Various other cost and capacity restrictions may be defined in the input data, e.g., leadership, station and equipment penalty groups that contribute to the total cost.

Figure 6:
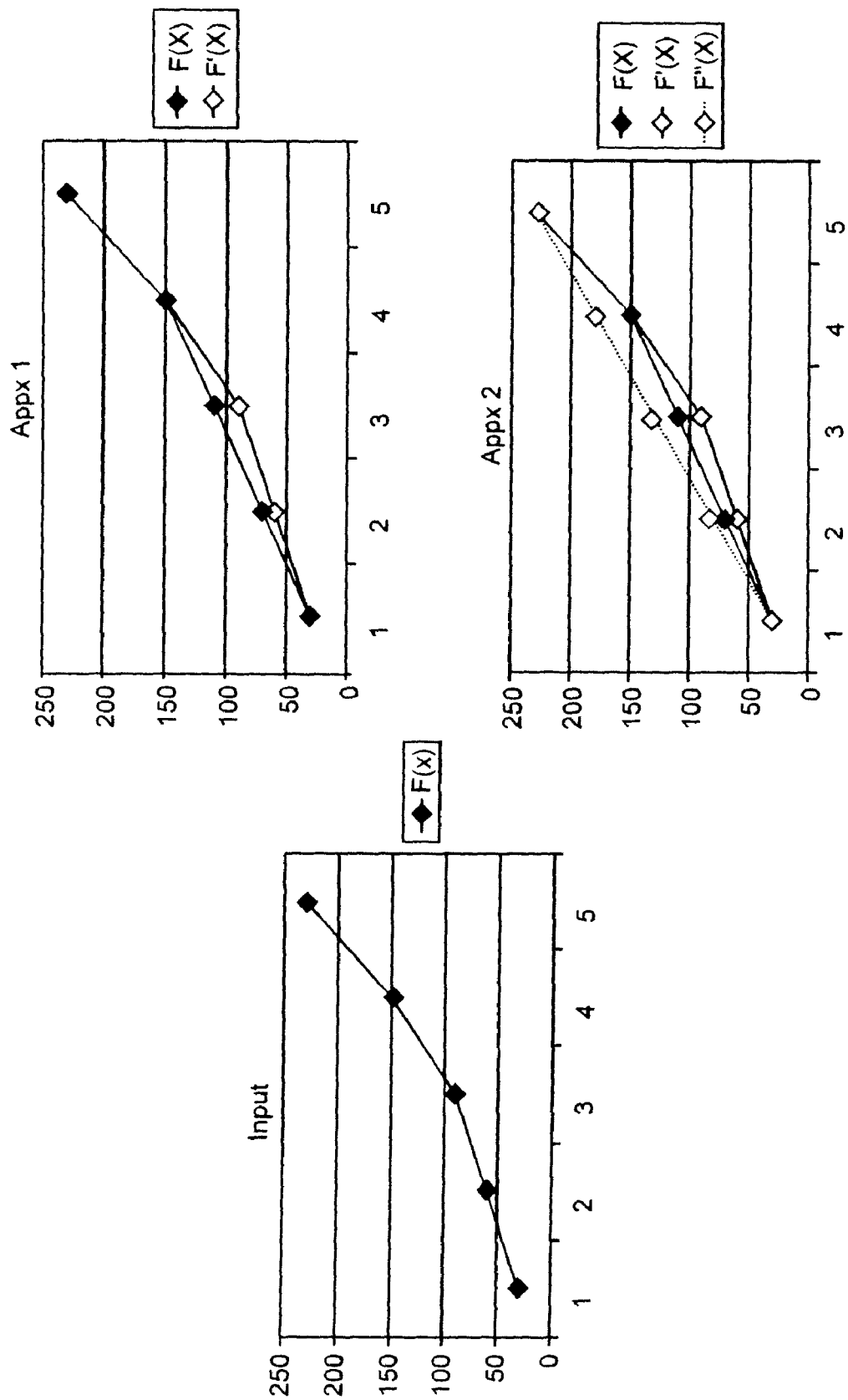
FIG. 6 is a graphical of similar functions but with different approximations.

Referring now to FIG. 6, there are shown graphs of simple functions. The x-axis of each graph corresponds to time, and the y-axis corresponds to the values of the function $f(x)$. Since the values are cumulative, they are always non-decreasing. The "Input" graph contains the "as-is" values of the function. The "Appx1" and "Appx2" graphs contain the output values of the function. Referring to the "Input" graph, there is shown a graph having "as-is" value of the function. This "as-is" value is given as an input to the application. It contains number of discrete data points corresponding to values of the function at different time intervals in machine readable format having:
  A set of x-axis values for the function.
  A set of y-axis values for the function.

For example, in the FPA (Fire Program Analysis) application, the fire perimeter input data contains data points representing cumulative perimeter growth values (y-axis), in chains/minute, at incremental time points (x-axis) during the course of a wild land fire. The "Appx1" and "Appx2" graphs are two alternate output functions that can be generated based on the value of the "threshold" input parameter. This transformation of input function "Input" to any one of the output functions "Appx1" or "Appx2" helps in compaction of the input function.

Figure 7:
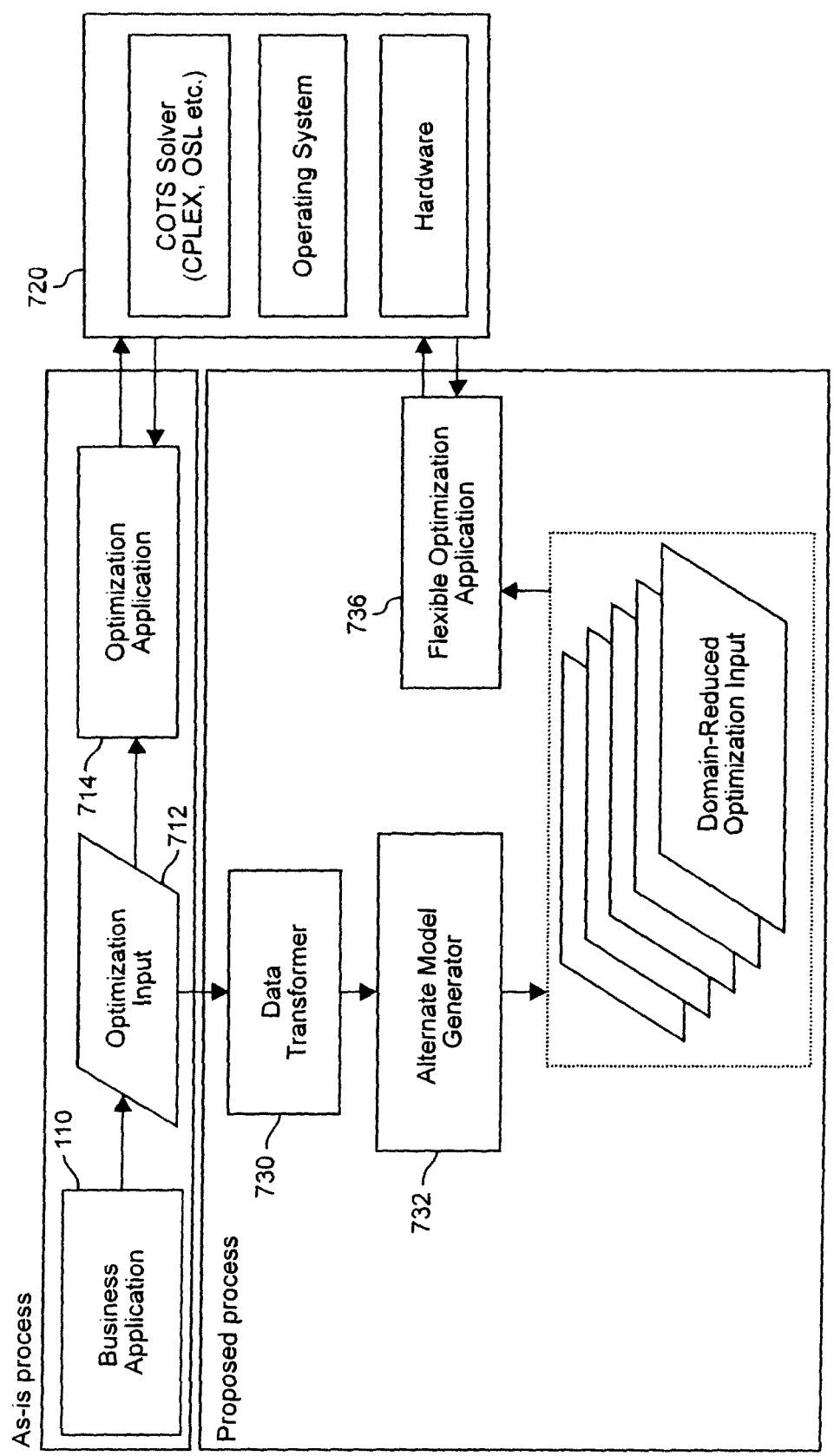
FIG. 7 is a block and data flow diagram showing an application of the invention to a specific project.

Referring now to FIG. 7, there is shown the "as-is" and "proposed" process for alternative representation of optimization model. Referring first to the "as-is" process, there is shown in the block diagram, the process used to solve optimization problem. The "Business Application" 710 is the component responsible for getting the user inputs and transforming those inputs to generate the set of functions to be used by the optimization engine. The output of this component is a machine generated function shown in the "Optimization Input" component 712. The "Optimization Application" 714 is the component that reads as input the machine generated "Optimization Input". This "Optimization Application" 714 then processes the "Optimization Input" 712 by using a commercial off-the-shelf (OTS) solver 720.

Referring next to the "proposed process", there is show in block diagram form an innovative computer implemented alternative model generation mechanism to solve the optimization model instances having varying degrees of size and complexity. The "Data Transformer" 730 is the component that takes as input, in a machine-readable data format, a set of functions, each of which contains:
  A set of x-axis values for the function.
  A set of y-axis values for the function.

The "Data Transformer" component 730 then produces as output for each of the functions, in a machine readable data format:
  A set of break-point values.
  A set of slope values for each piece defined by the break-point.
  The first coordinate (x-axis value) of the anchor point.
  The second coordinate (y-axis value) of the anchor point.

The "Data Transformer" component 730, during the transformation of the input function, also performs compaction of input data by eliminating redundant data points while maintaining the precision of the input function. The "Alternate Model Generator" 732 is the component that takes in the output from the "Data Transformer" 730 and also the following additional parameter in a machine-readable data format:

Pre-determined accuracy threshold.

The "Alternate Model Generator" component 732 then produces as output, for each of the functions, in a machine readable data format:

A set of break-point values.
A set of slope values for each piece defined by the break-point.
The first coordinate of the anchor point.
The second coordinate of the anchor point.

The "Alternate Model Generator" component 732 then enables model generation at varying levels of complexity (approximation) depending on pre-defined, business approved thresholds. According to the invention, there is provided an approach for generating alternative representations for an optimization model which has the following advantages:

Instances can be generated at varying levels of complexity depending on a pre-determined threshold. This in turn enables scalability.
Reduce model input and storage by extracting and compacting functional forms of the model parameters. In the case of FPA, the parameters include fire growth and resource deployment parameter data.
Solve an efficient model with reduced memory requirements, improved solution time, and improved solution quality.

More specifically, the invention provides a method for determining an alternative representation of an optimization model based on establishing an acceptable threshold for modifying parameters. According to the invention, Domain Reduction is achieved by a data transformation component,
Domain Reduction facilitates an efficient reformulation of the model, and
The spectrum of domain reduction results in a series of hierarchical model instances.

The "Flexible Optimization Application" 736 is the component that takes advantage of the alternate models and is designed and built in such a way that it works seamlessly with all types of functional forms. This is enabled by building the optimization application to work with complex data structures viz: piecewise linear functions.

Using Piecewise linear representations in the optimization application, enables the optimization application to work regardless of the size and complexity of the input model instance. It also enables the optimization application to work well with convex, concave, linear, or piece-wise linear functions consistently.

Figure 8:
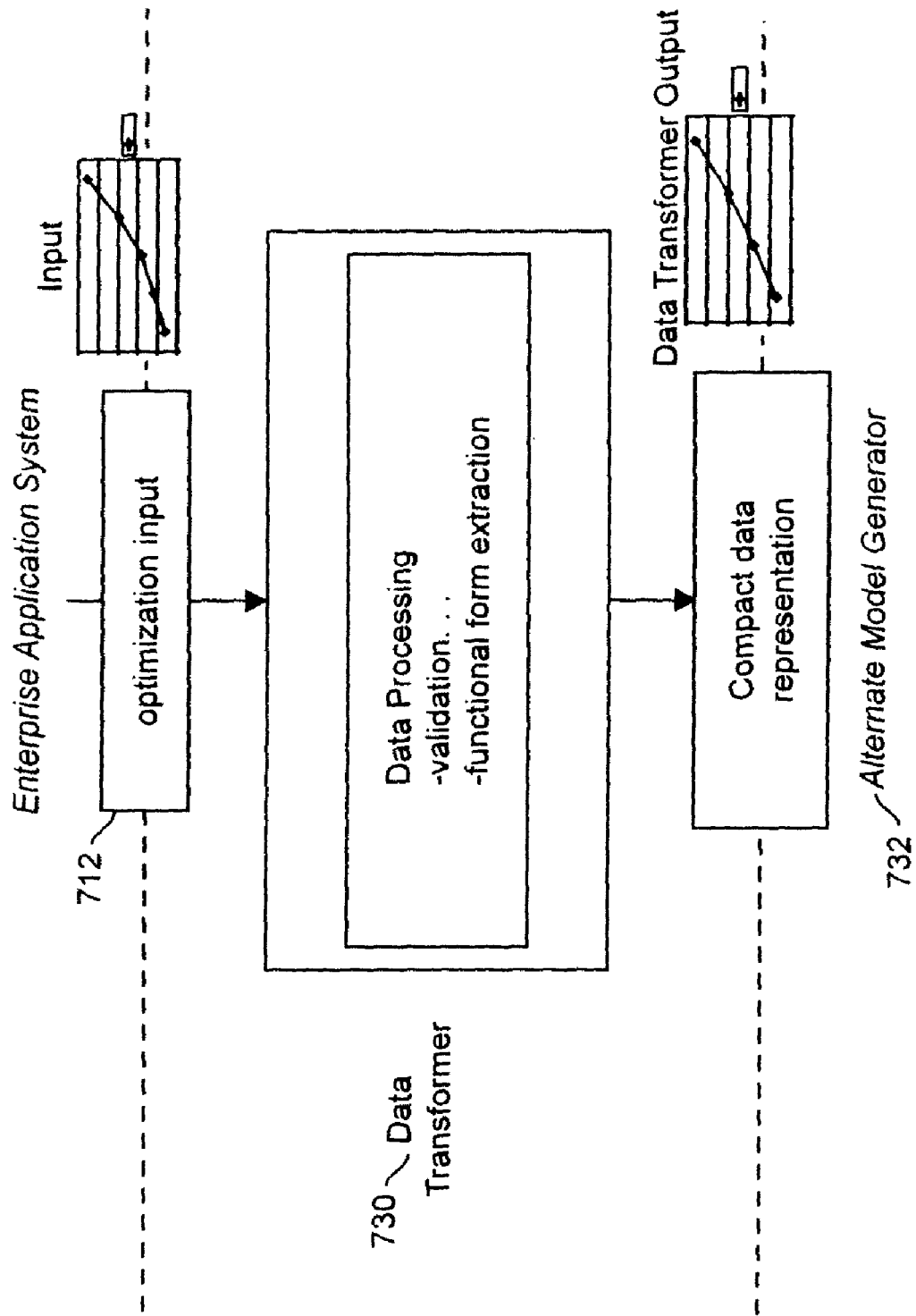
FIG. 8 is a block diagram illustrating in more detail the data transformer used in the system of FIG. 7.

FIG. 8 shows in more detail the "Data Transformer" component 730. This component takes as input, in a machine-readable data format, a set of functions, each of which contains:

A set of x-axis values for the function.
A set of y-axis values for the function.

The "Data Transformation" component 730 then produces as output for each of the functions, in a machine readable data format:

A set of break-point values.
A set of slope values for each piece defined by the break-point.
The first coordinate (x-axis value) of the anchor point.
The second coordinate (y-axis value) of the anchor point.

Figure 9:
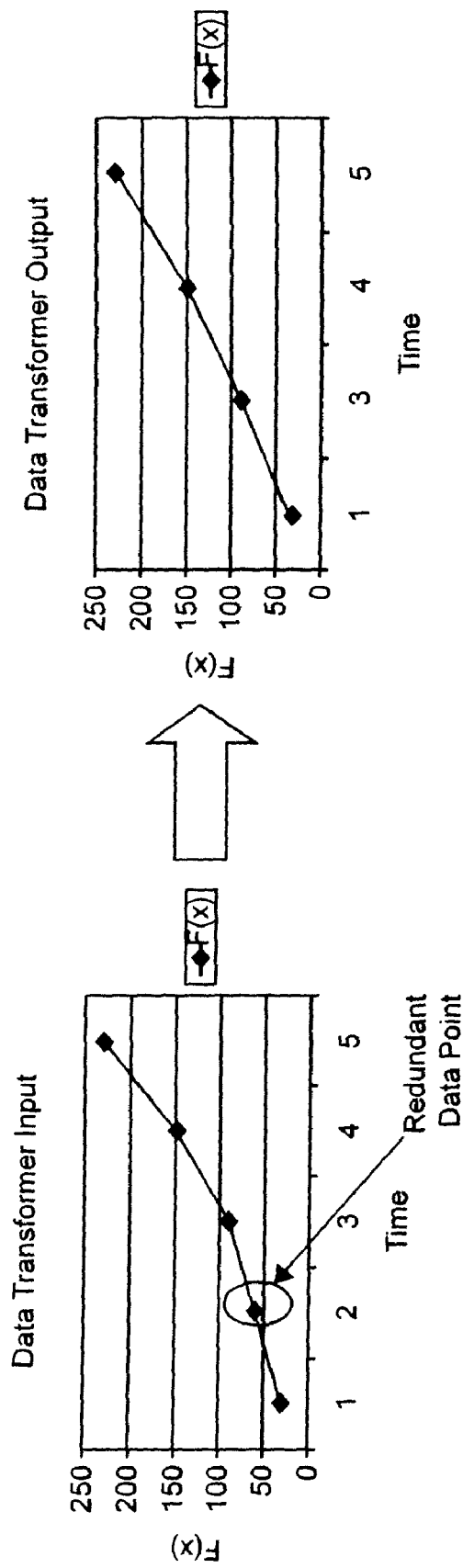
FIG. 9 is a graphical illustration of a data transformation example.

The "Data Transformation" component 730 converts the discrete data corresponding to input functions generated by Enterprise application system, a more compact machine readable format resulting in:

Elimination of redundant data points
Maintaining the precision i.e. keeping the exact functional forms
Reducing the memory footprint FIG. 9 shows a simple example of the working of "Data Transformer" component. The input function contains six discrete data points. This function when run through the "Data Transformer" component reduces the number of data points to five thereby resulting in compaction of the function without loss of precision.

Figure 10:
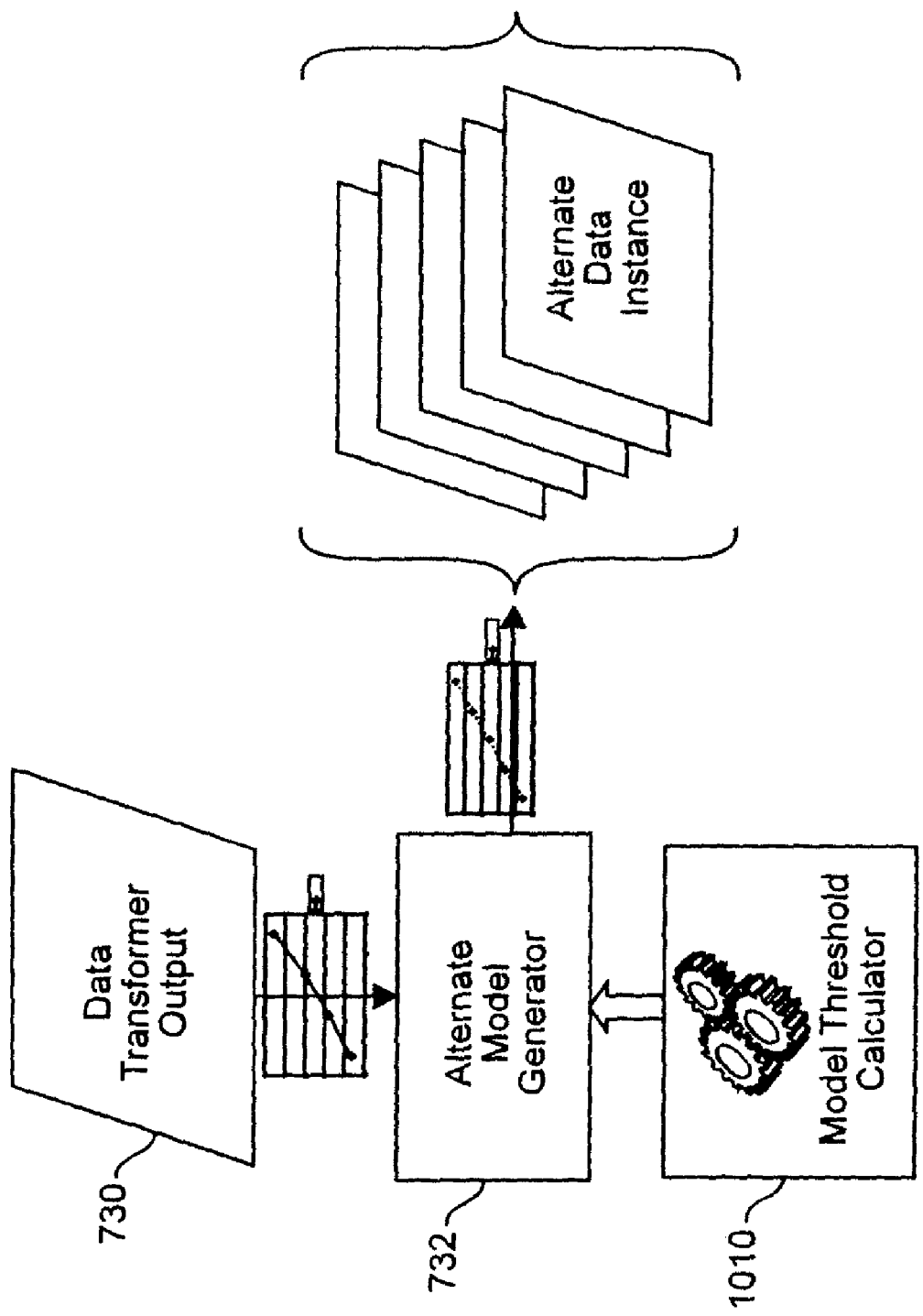
FIG. 10 is a block and data flow diagram illustrating an alternate model generator according to the invention.

FIG. 10 shows in more detail the "Alternate Model Generator" component 732. This component enables generation of data instance with reduced level of complexity depending on the input threshold. This enables scalability since now models with large size and extreme complexity become tractable. This component takes as input, the output from the previous step and also the following additional parameter in a machine-readable data format:

Pre-determined accuracy threshold 1010.

The "Alternate Model Generator" component 732 then produces as output, for each of the functions, in a machine readable data format:

A set of break-point values.
A set of slope values for each piece defined by the break-point.
The first coordinate of the anchor point.
The second coordinate of the anchor point.

This component then enables model generation at varying levels of complexity (approximation) depending on pre-defined, business approved thresholds.

Figure 11:
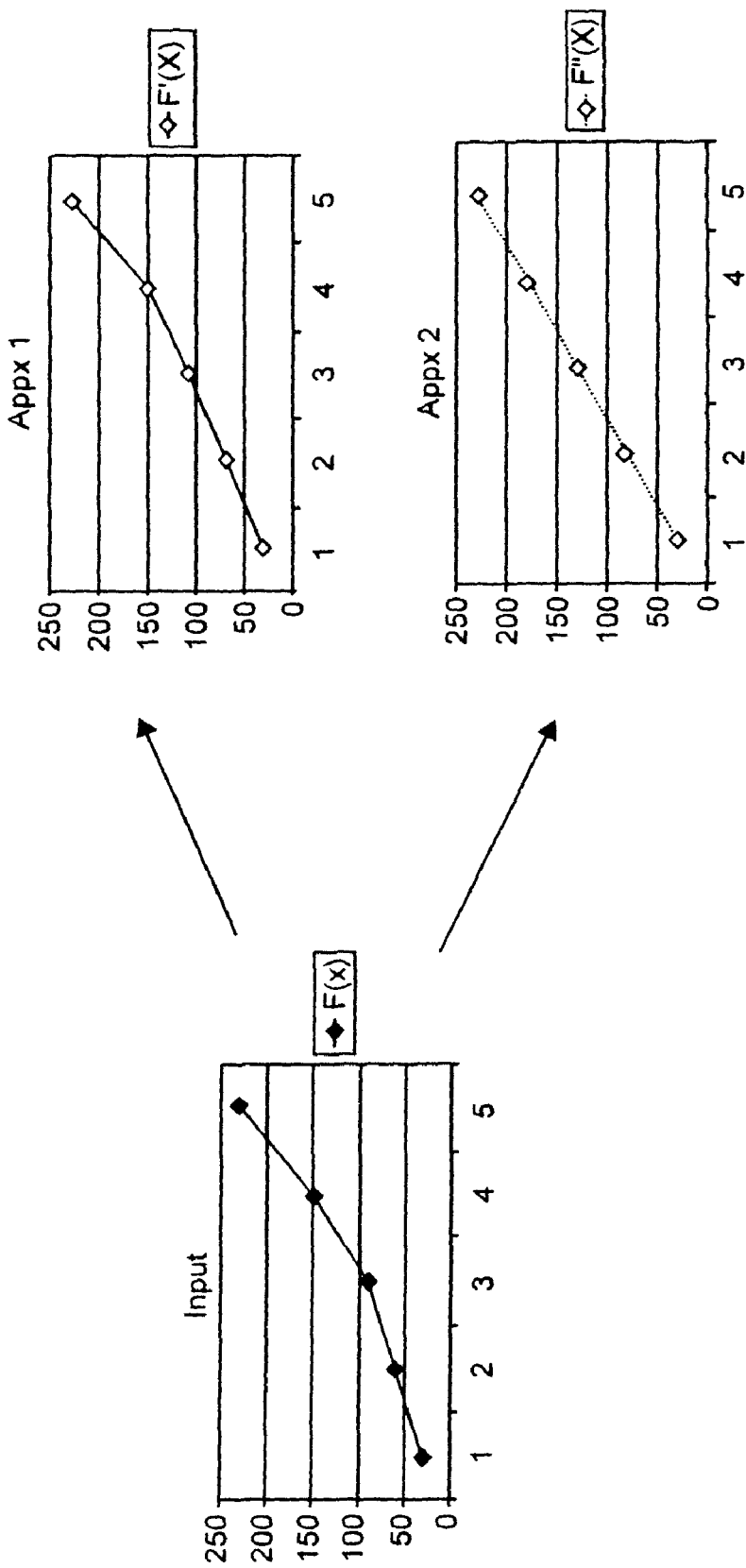
FIG. 11 is a graphical illustration of an alternate model generation example.

FIG. 11 shows a simple example of alternate model generation using two different values of threshold. Using different values of threshold, the figure shows-two resulting output functions "Appx1" and "Appx2". Also note that using threshold value zero, results in an output function that is the exact representation of the input function.

Figure 12:
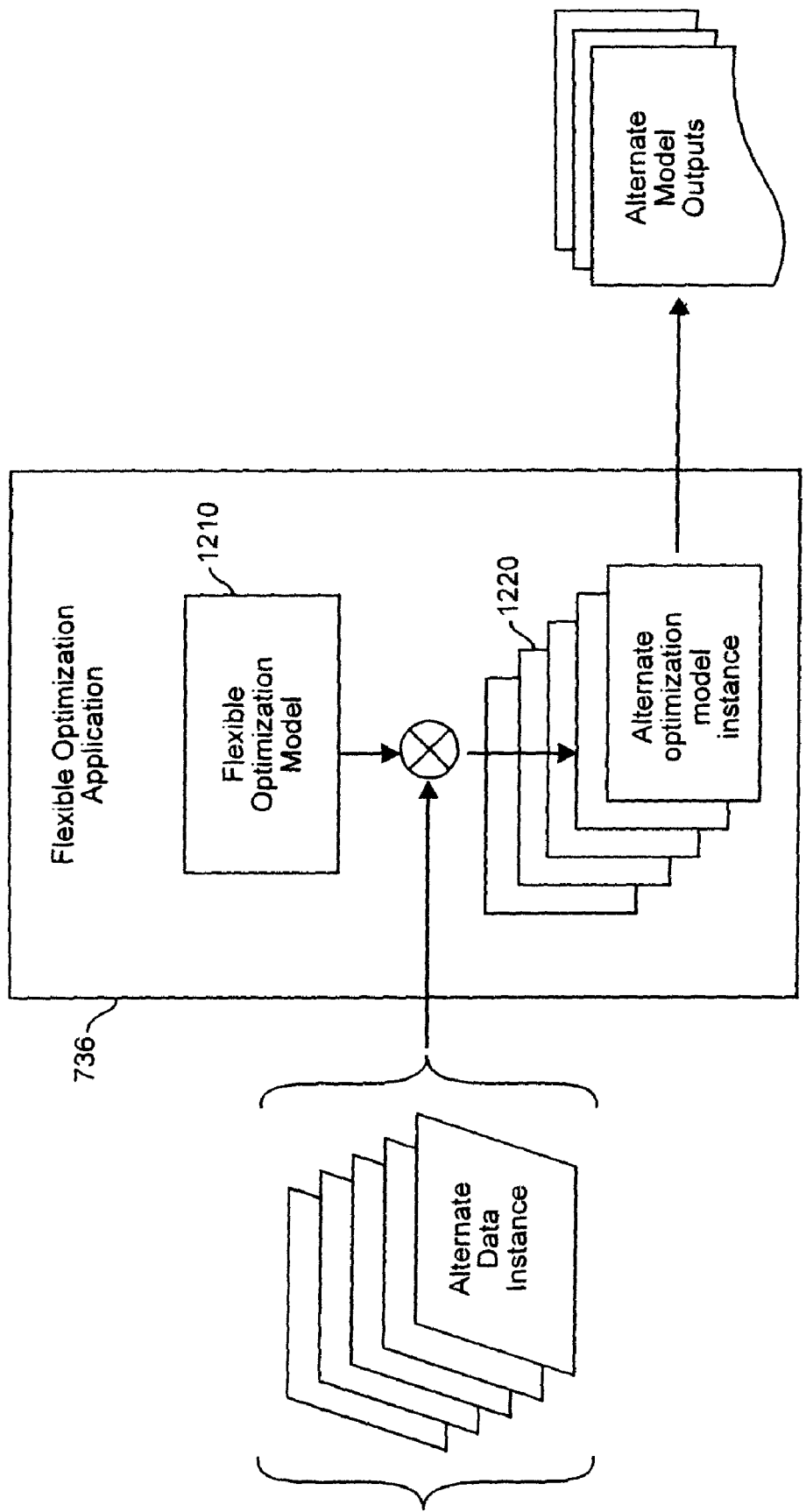
FIG. 12 is a block and data flow diagram illustrating a flexible optimization application.

Referring to FIG. 12, there is shown in more detail the "Flexible Optimization Application" component 736. The "Flexible Optimization Application" component takes advantage of alternate model generation capability to work seamlessly with all levels of approximations (including exact representation) of functional forms. This is enabled by building the optimization application to work with complex data structures viz: piecewise linear. Alternate data instances can be given as input to the Flexible Optimization Model 1210. These alternate data instances are created as a result of using different threshold values in the "Alternate Model" generator 732. Feeding these alternate data instances to the Flexible Optimization Model 1210, results in creation of alternate optimization model instances 1220. An optimization model instance is a computer representation resulting from combining the optimization model with the input data instance. It essentially contains a matrix of linear constraint coefficients. These alternate model instances are then solved using a COTS (commercial off-the-shelf) solver resulting in alternate model outputs. Since the alternate optimization model instances vary in size and complexity due to different threshold values applied, each of them results in an output that varies from the other. Generally the optimization model instances generated using low threshold are large in size and more complex and hence take more CPU (central processing unit) and memory to reach optimality than the ones generated using high threshold. Also the outputs of these optimization model inputs generated using low threshold are more precise than the other ones, since each of the function is very close in representation to the original input function.

According to the invention, there is provided an approach for generating alternative representations for an optimization model which has the following advantages:

Instances can be generated at varying levels of complexity depending on a pre-determined threshold. This in turn enables scalability.

Reduce model input and storage by extracting and compacting functional forms of the model parameters. In the case of the FPA, the parameters include fire growth and resource deployment parameter data.

Solve an efficient model with reduced memory requirements, improved solution time, and improved solution quality.

More specifically, the invention provides a method for determining an alternative representation of an optimization model based on establishing an acceptable threshold for modifying parameters. According to the invention, Domain Reduction is achieved by a data transformation component, Domain Reduction facilitates an efficient reformulation of the model, and The spectrum of domain reduction results in a series of hierarchical model instances.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method for generating an optimized model for a given system, comprising:

receiving in a computer a set of functions representing a set of events, each function comprising a set of first axis coordinate values and a corresponding set of second axis coordinate values;

transforming in a computer each of said functions to a compacted function to generate a set of compacted functions, each compacted function represented by a set of pieces, the set of pieces defined by an anchor point, a set of break-points, and a corresponding set of slopes, the anchor point and each of the break points having a first axis coordinate value and a second axis coordinate value, wherein the transforming step includes compacting by removing successive pieces having the same slope value;

generating in a computer, for each of said compacted functions, a plurality of alternate optimization models, each alternate optimization model based on the set of pieces representing the compacted function and on a predetermined accuracy value, wherein each alternate optimization model comprises a reduced set of approximating pieces defined by a reduced set anchor point, a reduced set of break-points, and a corresponding reduced set of slopes, the reduced set anchor point and each of the reduced set break points having a first axis coordinate value and a second axis coordinate value, wherein the generating step provides alternate optimization models of varying levels of approximation which depend on said predetermined accuracy level; and providing alternate data instances generated from one or more of said alternate optimization models by a system bus to an optimization application operated by a computer which solves an optimization problem based on said alternate data instances.

* * * * *